Patented Dec. 30, 1930

1,787,008

UNITED STATES PATENT OFFICE

OTTO LIEBKNECHT, OF BERLIN-GRUNEWALD, GERMANY, ASSIGNOR TO THE PERMUTIT COMPANY, OF NEW YORK, N. Y., A CORPORATION OF DELAWARE

PROCESS FOR INCREASING BASE-EXCHANGING PROPERTIES

No Drawing. Application filed February 2, 1927, Serial No. 165,488, and in Germany February 4, 1926.

The present invention has for its purpose increasing the base exchanging power of the glauconite of greensand, or similar minerals. Such minerals have the property of exchanging bases to a certain extent but the period of activity is shorter than is desirable; the mineral must be regenerated after having been used but a short time. By the present invention the base exchange capacity of the minerals is increased and thereby the period of activity between regenerations.

Increase of activity of the glauconite is caused by reacting upon the mineral with solutions of various salts of the alkalies, including those of ammonia, at temperatures above 70° C. and advantageously under pressure. In this operation the physical structure of the glauconite may or may not be changed but the capacity for base exchange is increased. The time required for reaction and the most desirable concentration of the salt solutions used depend partly on the nature of the salt and partly on the particular degree of increase of base exchange power required. In a general way, the higher the temperatures used the less time is required for reaction.

It is advantageous prior to the reaction of the salt solutions, to heat the glauconite to a temperature above 100° C. After the reaction with the salt solutions it is advantageous to wash and dry the material and then again heat it to a temperature above 100° C. but not exceeding 350° C.

A wide variety of salts may be used in my process, these salts including those having a pronouncedly alkaline reaction, as for instance the carbonate, silicate, borate or phosphate of an alkali metal, such as sodium, potassium or ammonia. As most advantageous, I regard a solution of a sodium silicate. Salts of less pronounced alkaline reaction may be employed as for instance chlorides, nitrates, lactates or acetates. With these salts the minimum temperature of operation is higher, being about 90° C., whereas with pronounced alkalin salts 80° C. may be regarded as a minimum. The glauconite to be treated may be admixed with an aqueous solution of about 10 to 30 per cent concentration and the two heated together. Afterwards the glauconite may be separated from the treating solution by centrifugal action. Or the solution may be passed several times through a layer of glauconite, passage being downward or upward. After a sufficient time is afforded for reaction to obtain the exchange power desired, which may be ascertained by testing the material from time to time in known ways, salt solution may be removed and the glauconite washed with pure water.

The glauconite or other mineral may be treated as it occurs in nature or after having been heated. Preliminary heating may be to 150 to 250° C.

The increase of base exchange power attained under the present invention is considerable; amounting to 30 to 50 per cent or more. For example, a charge of sand containing glauconite which in the natural state softened 2.8 cubic meters of water, after the described treatment softened 5 cubic meters of water.

As stated, I find most advantageous the use of a rather hot solution of waterglass or sodium silicate with a high alkali ratio; treatment being under superatmospheric pressure. By the use of this material in this way the physical properties of the mineral are somewhat changed, the color being altered and the volume increased. There is a substantial increase in the base exchanging power.

In a specific embodiment of my process using this alkaline waterglass solution, 50 parts by volume of granular glauconite are heated with 40 to 75 parts by volume of a waterglass solution. Potash waterglass or soda waterglass, or waterglasses containing both alkalies, may be used. Heating is for 2.5 hours to a temperature of about 200° C. in an autoclave. This corresponds to about 16 atmospheres pressure. After washing with water the resulting product has increased in volume to 75 parts and the color is light green instead of the original dark green. Improved results were obtained by preliminarily heating the mineral to a temperature above 100° C. Improved products were also obtained by reheating the washed and dried treated material to various temperatures between 100 and 350° C.

What I claim is:—

1. In the improvement in the base exchange power of glauconite the process which comprises heating glauconite with a solution of an alkali metal silicate under superatmospheric pressure until a substantial increase in base exchange power is attained.

2. In the improvement of the exchange power of glauconite the process which comprises heating glauconite with a solution of a salt of an alkali metal under superatmospheric pressure until a substantial increase in exchange power is attained.

3. In the improvement of the exchange power of glauconite the process which comprises heating glauconite with a solution of an alkaline reacting salt of an alkali metal under superatmospheric pressure until a substantial increase in exchange power is attained.

In testimony whereof I hereunto affix my signature.

OTTO LIEBKNECHT.